United States Patent
Hall (10) Patent No.: US 12,302,797 B1
(45) Date of Patent: May 20, 2025

(54) LOCKING MECHANISM FOR KNOTTER ASSEMBLIES

(71) Applicant: Great Plains Manufacturing, Inc., Salina, KS (US)

(72) Inventor: Jeffrey T. Hall, Salina, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 18/503,579

(22) Filed: Nov. 7, 2023

(51) Int. Cl.
*A01F 15/14* (2006.01)

(52) U.S. Cl.
CPC .................................. *A01F 15/145* (2013.01)

(58) Field of Classification Search
CPC ...................................................... A01F 15/145
See application file for complete search history.

(56) References Cited

U.S. PATENT DOCUMENTS

| | | | | |
|---|---|---|---|---|
| 6,164,197 | A * | 12/2000 | Prellwitz | A01F 15/145 100/22 |
| 6,957,835 | B2 * | 10/2005 | Rotole | A01F 15/145 100/29 |
| 7,752,959 | B1 * | 7/2010 | Roth | A01D 69/12 184/6 |
| 2005/0110276 | A1 * | 5/2005 | Rotole | A01F 15/145 289/2 |
| 2012/0211979 | A1 * | 8/2012 | Schumacher | A01F 15/145 100/29 |
| 2014/0103647 | A1 * | 4/2014 | Schoonheere | A01F 15/145 289/1.5 |
| 2015/0097370 | A1 * | 4/2015 | Schumacher | A01F 15/145 289/1.5 |
| 2018/0042182 | A1 * | 2/2018 | Yin | A01F 15/145 |
| 2021/0000018 | A1 * | 1/2021 | Acimas | A01D 59/04 |
| 2021/0195844 | A1 * | 7/2021 | Regier | A01F 15/148 |
| 2022/0000033 | A1 * | 1/2022 | Pasa | A01F 15/0858 |
| 2022/0030775 | A1 * | 2/2022 | Van Roje | A01F 15/14 |
| 2022/0030776 | A1 * | 2/2022 | van Roje | A01F 15/145 |
| 2022/0071099 | A1 * | 3/2022 | Baldauf | A01F 15/145 |
| 2022/0240454 | A1 * | 8/2022 | Baldsiefen | A01F 15/145 |
| 2023/0031888 | A1 * | 2/2023 | Cherney | A01F 15/145 |

* cited by examiner

*Primary Examiner* — Bao-Thieu L Nguyen
(74) *Attorney, Agent, or Firm* — Hovey Williams LLP; Kameron D. Kelly (57) ABSTRACT

Shiftable lock assemblies for knotter assemblies in baling systems are provided that improve a user's accessibility of the knotter assemblies without the need for tools or by removing any components from the baling system. While in the locked position, the shiftable lock assemblies can keep the knotting mechanisms in the operating position; however, once easily moved into the unlocked position, the knotting mechanisms may be simply rotated to a passive position. Consequently, due to the shiftable lock assemblies of the present disclosure, routine maintenance on the knotter assemblies may be significantly easier to carry out.

23 Claims, 8 Drawing Sheets

LOCKING MECHANISM FOR KNOTTER ASSEMBLIES

BACKGROUND

1. Field of the Invention

The present invention is generally related to knotter assemblies for baling systems. More particularly, the present invention is generally related to locking mechanisms for knotter assemblies in baling systems.

2. Description of the Related Art

To produce bales of crop material, a prime mover such as a tractor will generally propel a baling implement (referred to herein as a "baler") through a field of crop material that has been cut and is lying in the field. The baler is configured to pick up the crop material and stuff the crop material into a baling chamber, where the crop material is compressed into bales via a plunger. A knotter assembly will then tie one or more securement lines (e.g., twine) around each bale to hold the bale together before the bale is ejected from the baler. The knotter assemblies are notoriously complicated and have a lot of parts that wear or need adjusted over time.

Typically, knotter assemblies are bolted or pinned directly to the frame to hold the assemblies in the operating position. Generally, knotter assemblies in conventional balers can be shifted from the operating position and into a passive position to provide access and facilitate routine maintenance. However, transitioning conventional knotter assemblies from the operating position to the passive position, where routine maintenance may be carried out, can be time consuming and involve the removal of small locking parts that lock the knotter assemblies in the operating position. Unfortunately, these small locking parts can be difficult to remove and, in many cases, may be easily misplaced and lost.

Accordingly, further modifications and improvements are needed for knotter assemblies in baling systems.

SUMMARY

One or more embodiments of the present disclosure generally concern a baler system for forming bales. Generally, the baler system comprises: (a) a baler frame configured to support the baler system; (b) one or more knotter assemblies configured to wrap and tie securement lines around a formed bale, wherein the knotter assemblies comprise a shaft and at least one knotting mechanism positioned on the shaft, wherein the knotting mechanism is configured to rotatably shift on the shaft between an operating position and a passive position; (c) an engagement assembly extending from the knotting mechanism; and (d) a shiftable lock assembly configured to selectively shift between a locked position and an unlocked position, wherein the shiftable lock assembly comprises a handle, at least one locking extension, and a notch configured to engage the engagement assembly when in the locked position, wherein the shiftable lock assembly secures the knotting mechanism in the operating position when in the locked position.

One or more embodiments of the present disclosure generally concern a method for accessing a knotter assembly in a baler system for forming bales. Generally, the method comprises: (a) providing the baler system comprising-(i) a baler frame configured to support the baler system, (ii) one or more knotter assemblies configured to wrap and tie securement lines around a formed bale, wherein the knotter assemblies comprise a shaft and at least one knotting mechanism positioned on the shaft, wherein the knotting mechanism is configured to rotatably shift on the shaft between an operating position and a passive position, (iii) an engagement assembly extending from the knotting mechanism, and (iv) a shiftable lock assembly configured to selectively shift between a locked position and an unlocked position, wherein the shiftable lock assembly comprises a handle, at least one locking extension, and a notch configured to engage the engagement assembly when in the locked position, wherein the shiftable lock assembly secures the knotting mechanism in the operating position when in the locked position, wherein the shiftable lock assembly is in the locked position and the knotting mechanism is in the operating position; (b) disengaging the shiftable lock assembly from the locked position and into the unlocked position; and (c) transitioning the knotting mechanism from the operating position to the passive position.

One or more embodiments of the present disclosure generally concern a baler system for forming bales. Generally, the baler system comprises: (a) a baler frame configured to support the baler system, wherein the baler frame comprises an upwardly-extending frame extension; (b) one or more knotter assemblies configured to wrap and tie securement lines around a formed bale, wherein the knotter assemblies comprise a shaft and at least one knotting mechanism positioned on the shaft, wherein the knotting mechanism is configured to rotatably shift on the shaft between an operating position and a passive position; (c) an engagement assembly extending from the knotting mechanism, wherein the engagement assembly is configured to engage with the frame extension when the knotting mechanism is in the operating position; and (d) a shiftable lock assembly configured to move into a locked position and an unlocked position, wherein the shiftable lock assembly comprises a main body, a handle, at least one locking extension, a notch within the main body configured to engage the engagement assembly, and a biasing mechanism configured to bias the main body against the frame extension, wherein the shiftable lock assembly secures the knotting mechanism in the operating position when in the locked position, wherein the frame extension comprises at least one lateral aperture configured to engage the locking extension of the shiftable lock assembly when in the locked position.

BRIEF DESCRIPTION OF THE FIGURES

Embodiments of the present invention are described herein with reference to the following drawing figures, wherein.

DETAILED DESCRIPTION

Figure 1:
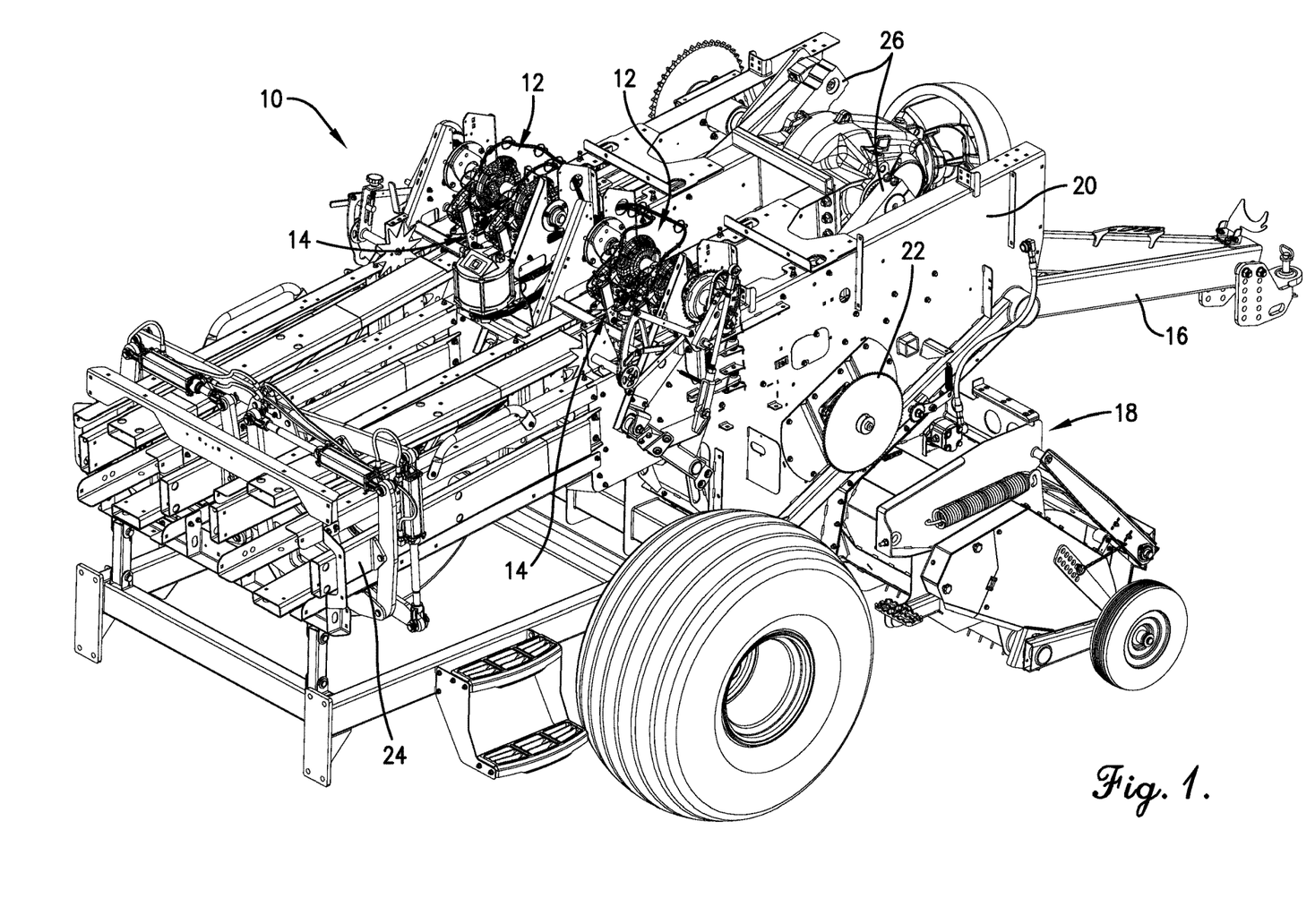
FIG. 1 is a rear perspective view of a baling system including a plurality of knotter assemblies and shiftable lock assemblies according to embodiments of the present invention.

The present disclosure is directed to shiftable lock assemblies for knotter assemblies, which improve a user's accessibility of the knotter assemblies without the need for tools or by removing any components from the baling system to unlock the knotter assemblies. Embodiments of the present invention configured to address the challenges discussed above are illustrated in FIG. 1. As shown in FIG. 1, a baling system 10 may comprise a plurality of knotter assemblies 12 configured to tie securement lines (e.g., twine) around the formed bales to hold the bale together. The knotter assemblies 12 may be held and maintained in an operating position by shiftable lock assemblies 14, which can be manually disengaged (as discussed in further detail below), thereby allowing a user to shiftably rotate a knotter assembly 12 from the operating position to a passive position. While in the passive position, the user may readily and easily conduct routine maintenance on the knotter assembly 12.

As depicted in FIG. 1, the exemplary baling system 10 is configured as a square baler that forms small, square bales of crop material. It should be understood, however, that the term "square baler" is used in its conventional sense to denote a baler that forms bales having the general shape of cuboid. The baling system 10 may comprise a tow bar 16 configured to connect with a tractor, such that the tractor can pull the baling system 10 through a field. During such transport, the baling system 10 may pick up crop material laying on the surface of the field in a windrow via a pickup assembly 18. The pickup assembly 18 may comprise a rotor or auger configured to pick up crop material and direct the crop material upward and rearward to a pre-compression chamber 20. In the pre-compression chamber 20, a stuffer assembly 22 may force charges of the crop material upward into one or more baling chambers 24. The baling system 10 may further comprise one or more plungers 26 for compressing the charges of crop material within the baling chambers 24 into bales. Once a bale has been formed to an appropriate size, the baling system 10 may include one or more knotter assemblies 12 configured to tie securement lines (e.g., twine) around the bale to hold the bale together.

As shown in FIG. 1, the baling system 10 may comprise two baling chambers 24 for simultaneously forming bales in each of the baling chambers 24. However, the baling system 10 may comprise various other numbers of baling chambers 24, such as one, three, four, or more baling chambers 24. In general, the baling system 10 will include a number of plungers 26 that corresponds with the number of baling chambers 24. For instance, with the embodiment shown in FIG. 1, the baling system 10 may comprise two plungers 26, with each plunger 26 configured to compress charges of crop material into a bale in one of the baling chambers 24.

Similarly, the baling system 10 will generally include a number of knotter assemblies 12 that corresponds with the number of baling chambers 24. For instance, with the embodiment shown in FIG. 1, the baling system 10 may comprise two knotter assemblies 12, with each knotter assembly 12 configured to tie securement lines around the bales being formed in one of the baling chambers 24. In some embodiments, each knotter assembly 12 may comprise two or more knotting mechanisms 28 (see FIG. 2), each being configured to tie a single securement line around a bale. Thus, each knotter assembly 12 may include two knotting mechanisms 28, so as to be configured to tie two securement lines around a bale.

Each knotting mechanism 28 of a knotter assembly 12 may comprise: a knotter disc, a billhook assembly (e.g., a billhook, a billhook spring, a billhook cam, a billhook pinion), strand holder, strand knife, and/or the like. Furthermore, each knotter assembly 12 may include a rotatable shaft 32, which may be configured as an axle, and which is configured to actuate various of the components of the associated knotter assembly 12. As such, in the embodiments that include two knotter assemblies 12 (see, e.g., FIG. 1), a left-side knotter assembly 12 may include one rotatable shaft, and a right-side knotter assembly 12 may include one rotatable shaft. In addition, each of the knotter assemblies 12 may include one or more needles used to wrap a securement line completely around a bale of crop material once the bale is fully formed, such that the associated knotting mechanisms can tie the securement line securely around the fully formed bale. As was noted above, each knotter assembly 12 may include a plurality of knotting mechanisms 28 and a corresponding plurality of needles, such that each knotter assembly 12 can be configured to wrap and tie a plurality of (e.g., two) securement lines around a bale being formed in a baling chamber 24. Each knotter assembly 12 may additionally comprise a trip mechanism that can be used to initiate the tying process once a bale of crop material has been fully formed.

Figure 2:
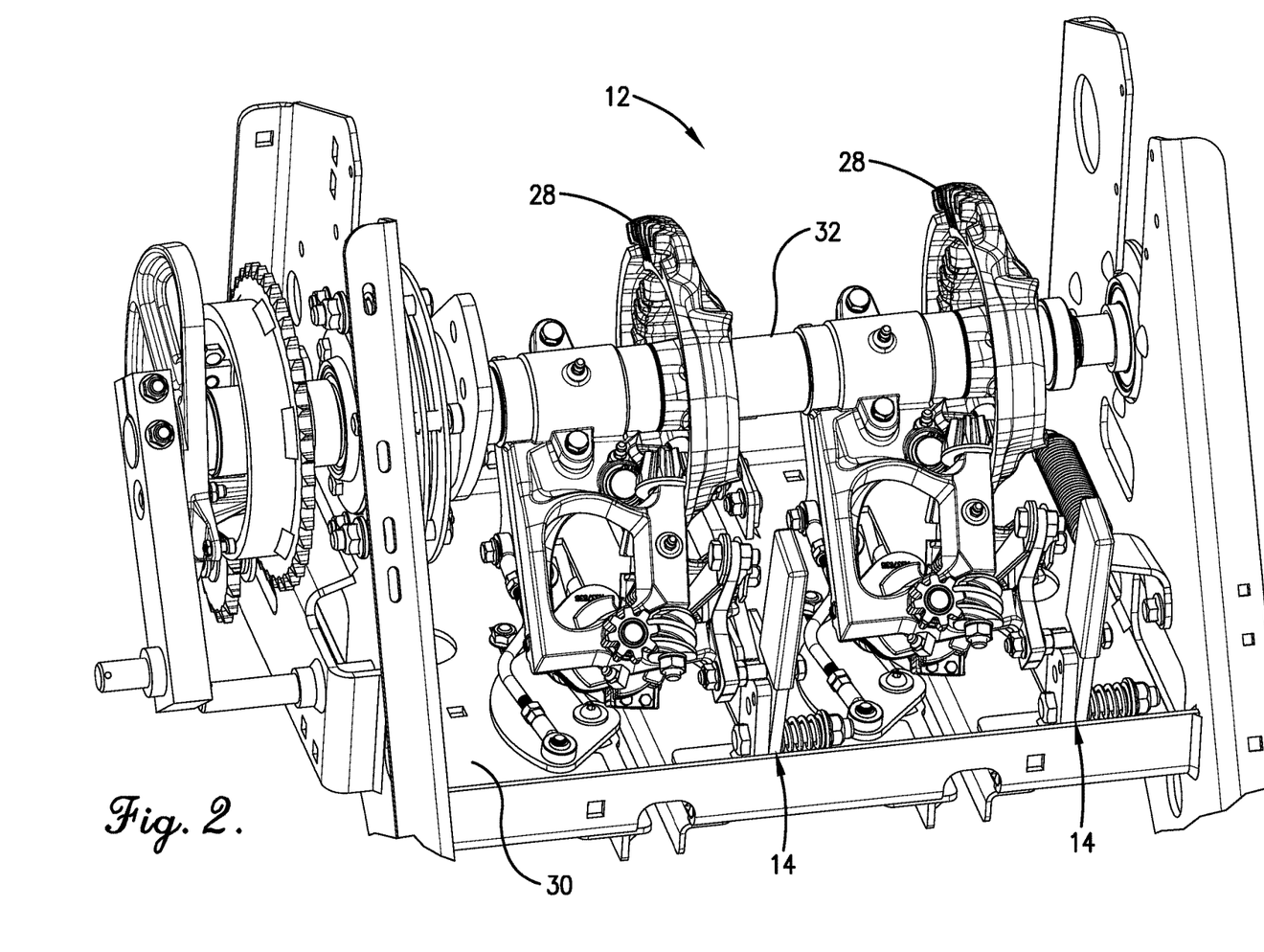
FIG. 2 is a rear, left-side perspective view of a knotter assembly from FIG. 1 with the knotter assembly including two knotting mechanisms in the operating position and shiftable lock assemblies in a locked position.

As shown in FIG. 2, each knotter assembly 12 may be configured to include two knotting mechanisms 28 so as to tie two securement lines around each bale. However, each knotter assembly 12 may comprise various other numbers of knotting mechanisms 28, such as one, three, four, or more knotting mechanisms 28. As depicted in FIG. 2, the knotter assembly 12 may be operably connected to the frame 30 of the baling system 10. Additionally, as noted above, each knotter assembly 12 may include a rotatable shaft 32, which may be configured as an axle, and upon which the knotting mechanism 28 is swingably mounted relative to the frame 30 of the baling system 10. Moreover, a shiftable lock assembly 14 can be associated with each knotting mechanism 28, which can selectively lock the knotting mechanism 28 in the operating position. However, the shiftable lock assembly 14 can be shiftably disengaged from the knotting mechanism 28, so that the knotting mechanism 28 can swingably rotate on the shaft 32 from the operating position to the passive position. It is generally understood that when the knotting mechanisms 28 are in the operating position, the knotting mechanisms 28 are rotated downward so as to function normally for tying securement lines around bales. In contrast, when the knotting mechanism 28 are in the passive position, the knotting mechanisms 28 are rotated upward so that the knotting mechanism 28 do not function to tie securement lines around bales but are accessible for maintenance and repair.

Figure 3:
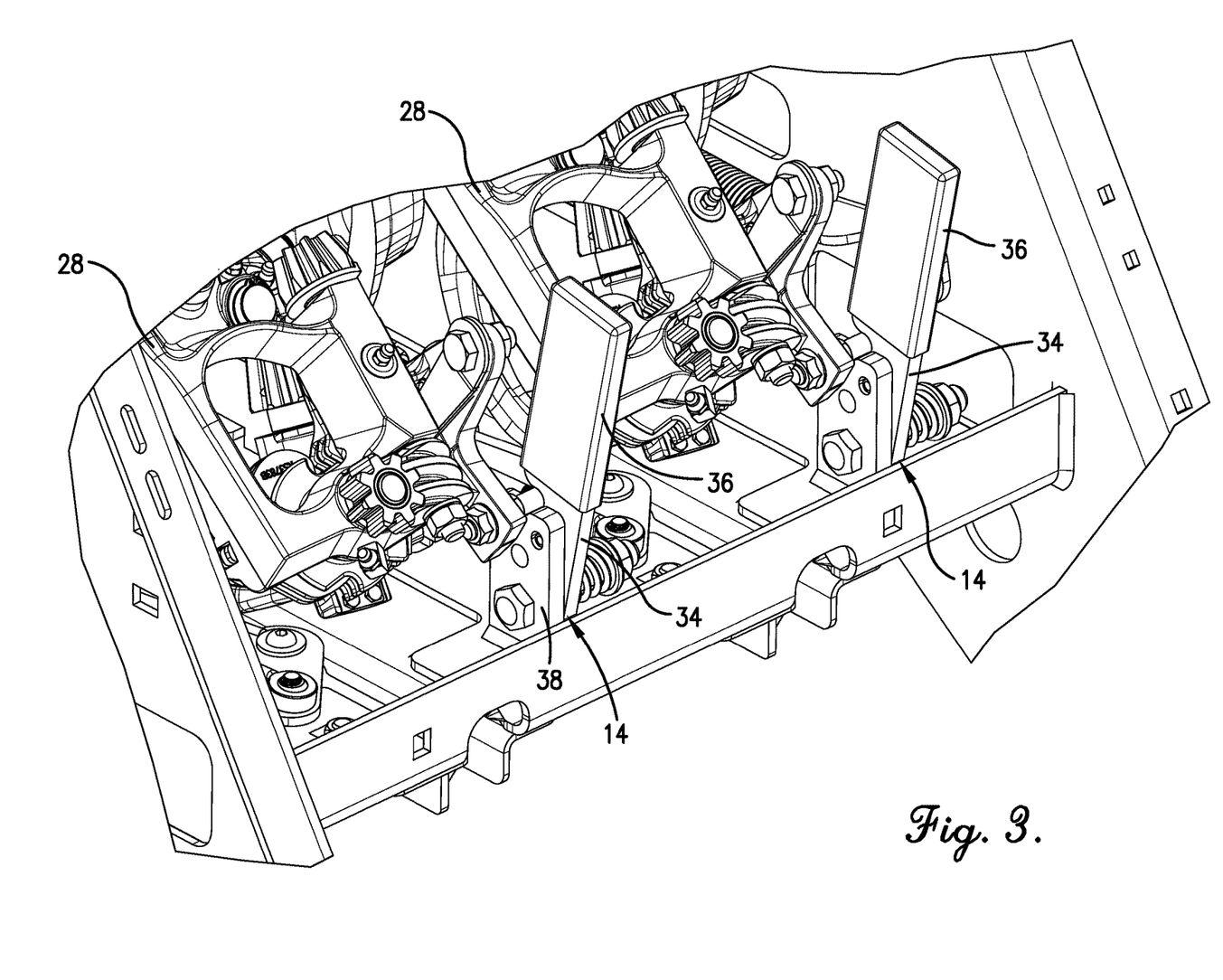
FIG. 3 is a rear, left-side perspective view of the shiftable lock assemblies from FIG. 2.
Figure 4:
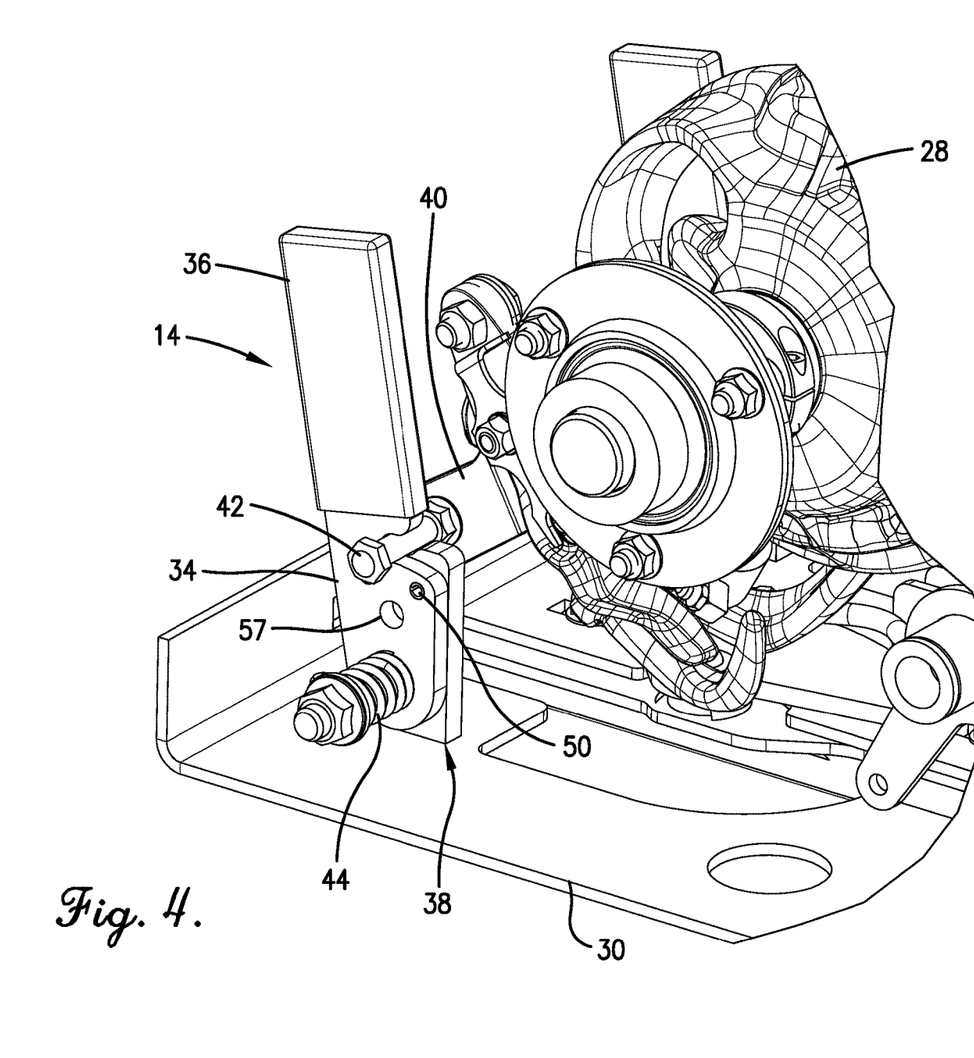
FIG. 4 provides another side perspective view of one of the shiftable lock assemblies from FIG. 2.
Figure 5:
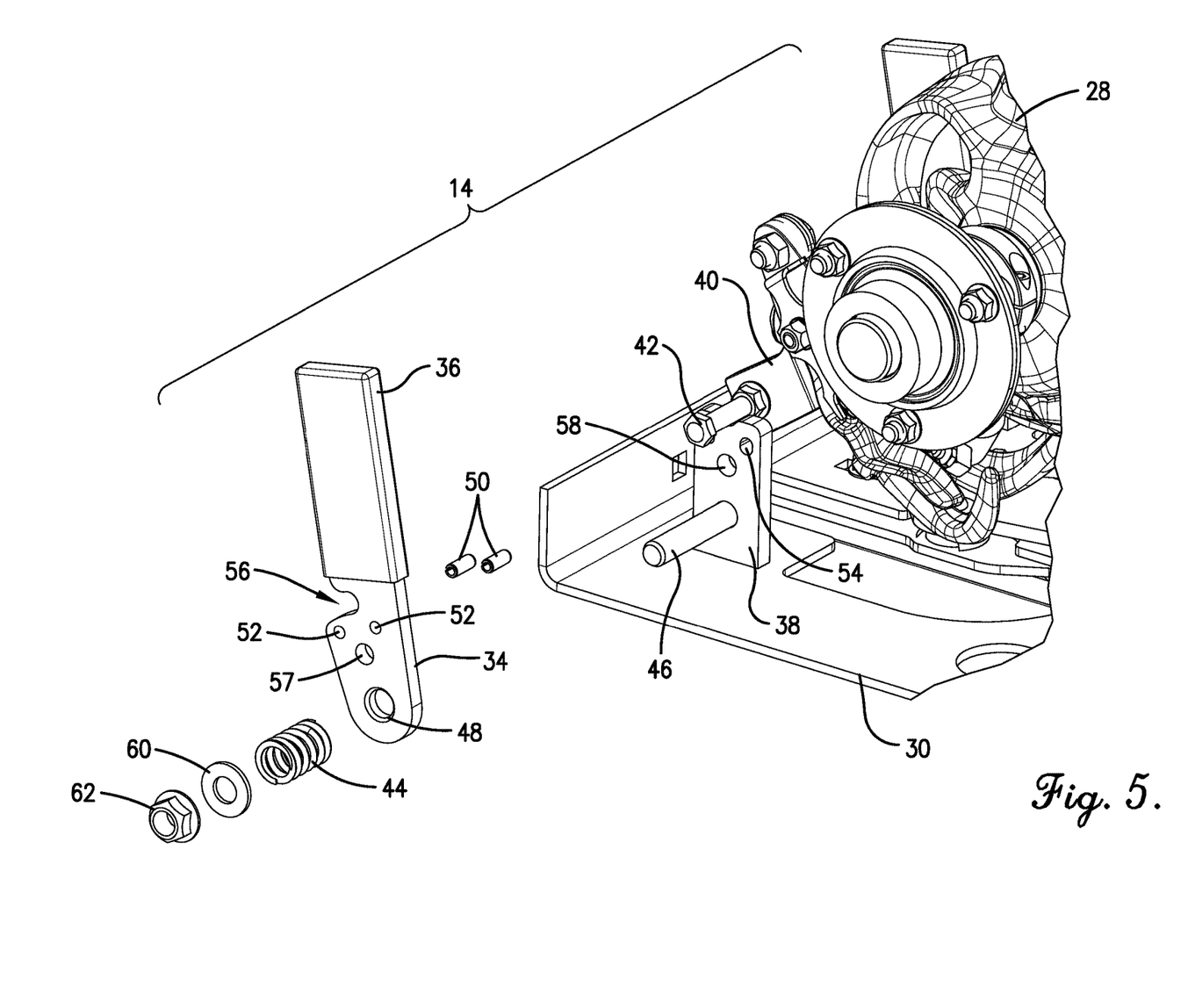
FIG. 5 provides an exploded view of the shiftable lock assembly from FIG. 4.

The shiftable lock assemblies 14 are depicted in greater detail in FIGS. 3-5. As shown in FIG. 3, each of the shiftable lock assemblies 14 correspond to a single knotting mechanism 28 within the knotter assemblies 12. The shiftable lock assemblies 14 may comprise a lock mechanism body 34 having a lower portion and an upper portion, with the upper portion providing a handle 36. The handle 36 can be gripped by an individual and used to shiftably disengage the shiftable lock assembly 14 as described below. As illustrated in FIG. 3, a lower portion of the lock mechanism body 34 of the shiftable lock assembly 14 may be pivotably coupled with an upwardly-extending frame extension 38 that extends upward from the frame 30 of the baling system 10.

FIGS. 4 and 5 demonstrate how the shiftable lock assembly 14 engages the knotting mechanism 28 and holds the knotting mechanism 28 in the operating position. As shown in FIGS. 4 and 5, the knotting mechanism 28 has a head extension 40 with an engagement assembly 42 (e.g., a laterally-extending arm or bolt with nut) that extends laterally from the head extension 40. Such head extension 40 and engagement assembly 42 are rigidly secured to remaining components of the knotting mechanism 28. Additionally, the shiftable lock assembly 14 contains a biasing mechanism 44 (e.g., a spring) positioned on a bolt 46 affixed to the frame extension 38. The bolt 46 extends through the lower portion of the lock mechanism body 34 via a chamfered aperture 48, thereby pivotably connecting the lock mechanism body 34 with the frame extension 38. The biasing mechanism 44, which is positioned on the opposite side of the lock mechanism body 34 from frame extension 38, biases and holds the lock mechanism body 34 against the frame extension 38 when the lock mechanism body 34 is in the locked position.

With reference to FIG. 5, when biased against the frame extension 38 in the locked position, locking pins 50 extending from lateral lock pin apertures 52 of the lock mechanism body 34 can extend and engage with corresponding lateral lock pin apertures 54 within the frame extension 38. Although FIG. 5 depicts the shiftable lock assembly 14 containing two locking pins 50, the shiftable lock assembly 14 may utilize a different number of locking pins 50. For example, the shiftable lock assembly may contain at least one, two, three, or four locking pins. The biasing mechanism 44 can be held in place on the bolt 46 via a washer 60 and nut 62 so that the biasing mechanism 44 can press and bias against the lock mechanism body 34, thereby causing the locking pins 50 to engage the frame extension 38 and hold the shiftable lock assembly in the locked position.

As shown in FIG. 4, the frame extension 38 can function as a down stop for the engagement assembly 42 from the head extension 40 and can prevent the knotting mechanism 28 from moving down past the operating position. Additionally, as shown in FIGS. 4 and 5, the engagement assembly 42 from the head extension 40 can engage and rest in a notch 56 of the lock mechanism body 34 when the knotting mechanism 28 is in the operating position and the shiftable lock assembly 14 is in the locked position. The notch 56 of the lock mechanism body 34 also functions as a down stop for the engagement assembly 42, thereby preventing the knotting mechanism 28 from moving past the operating position.

As demonstrated in FIGS. 4 and 5, the knotting mechanism 28 can be locked in the operating position by the shiftable lock assembly 14 while the assembly 14 is in the locked position. While in the locked position, the locking pins 50 within the lock mechanism body 34 engage the frame extension 38, thereby preventing the lock mechanism body 34 from moving. Additionally, while in the locked position, the engagement assembly 42 from the head extension 40 rests on the frame extension 38 and is held within the notch 56 of the lock mechanism body 34. When in the locked position, the notch 56 prevents the engagement assembly 42 (and thus the knotting mechanism 28) from being raised, thereby securing the knotting mechanism 28 in the operating position.

Additionally, as shown in FIGS. 4 and 5, the lock mechanism body 34 may comprise a secondary lateral aperture 57 and the frame extension 38 may comprise a secondary lateral aperture 58. Secondary apertures 57 and 58 can facilitate the insertion of a bolt (not pictured), which may prevent the shiftable lock assembly 14 from being disengaged from the locked position.

Figure 6:
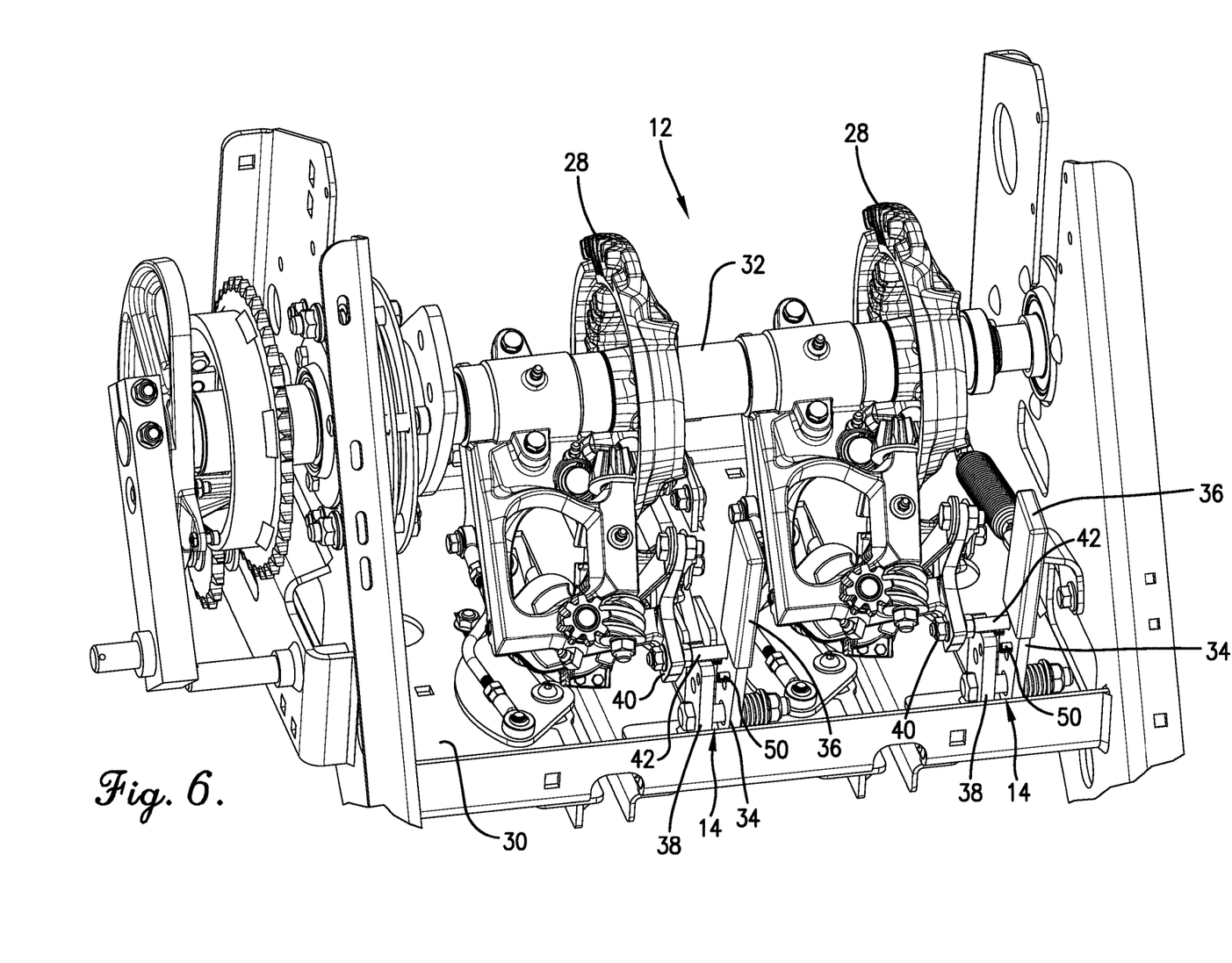
FIG. 6 is a rear, left-side perspective view of the knotter assembly from FIG. 2 with the shiftable lock assemblies disengaged from the locked position.
Figure 7:
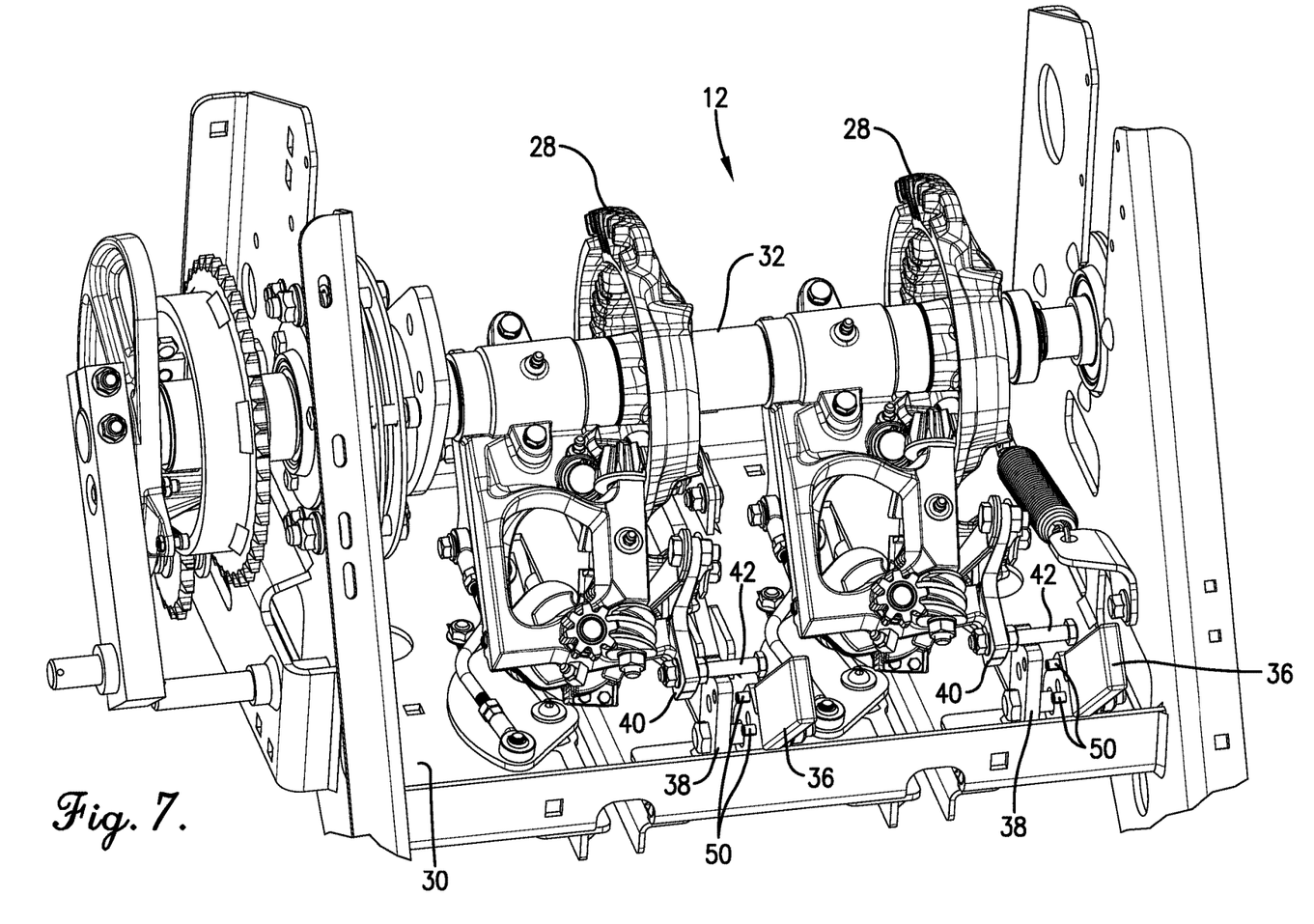
FIG. 7 is a rear, left-side perspective view of the knotter assembly from FIG. 6 with the shiftable lock assemblies disengaged from the locked position and pulled down into an unlocked position.
Figure 8:
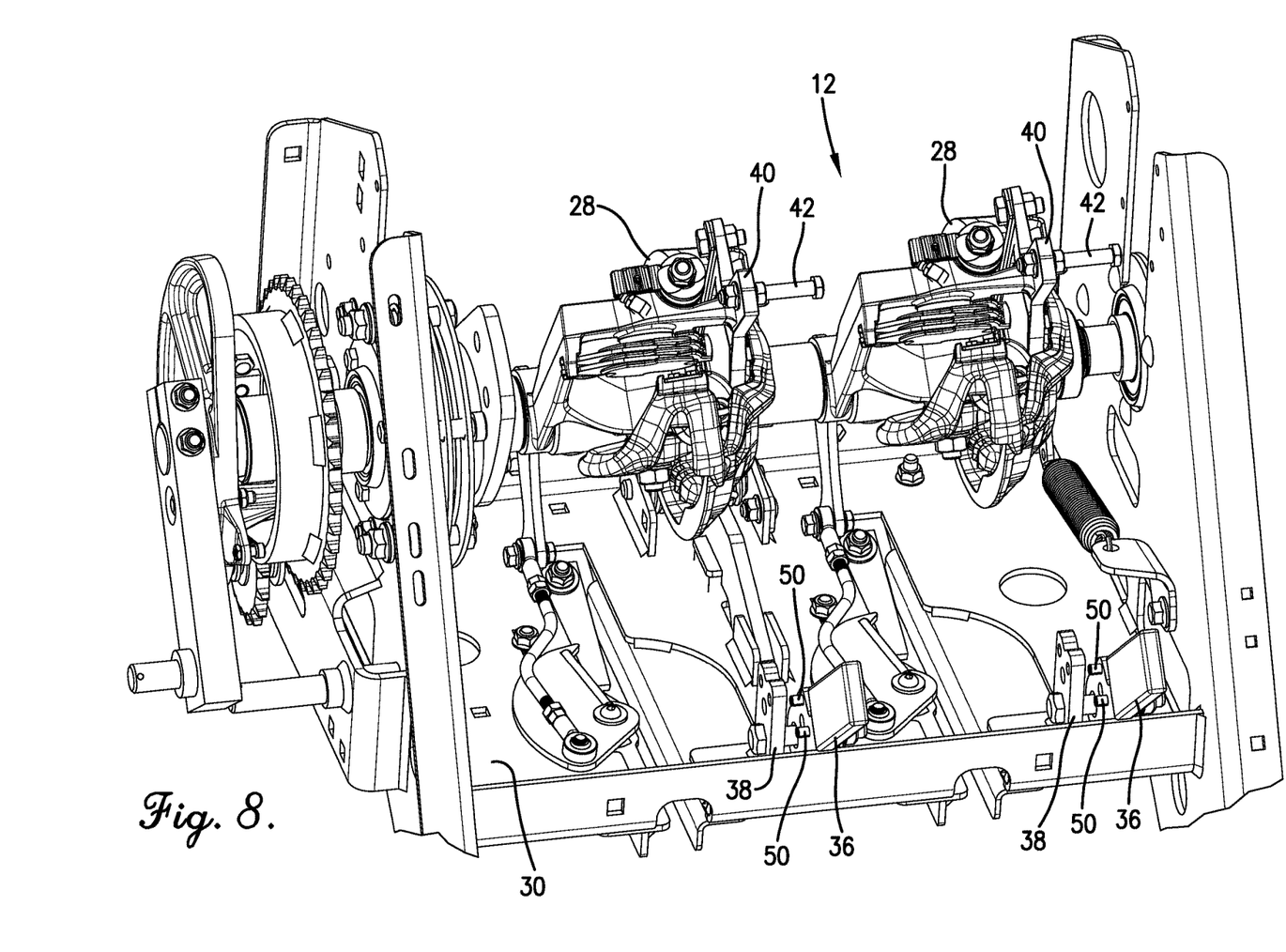
FIG. 8 is rear, left-side perspective view of the knotter assembly from FIG. 7 with the shiftable lock assemblies in the unlocked positions and the knotting mechanisms rotated into a passive position.

FIGS. 6-8 demonstrate how the shiftable lock assembly 14 may be disengaged from the locked position into the unlocked position, thereby allowing the knotting mechanism 28 to rotatably shift upward from the operating position to the passive position.

As shown in FIG. 6, in order to disengage the shiftable lock assembly 14 from the locked position, the handle 36 of the lock mechanism body 34 can be gripped by a user and tilted in a direction away from the frame extension 38 and the knotting mechanism 28 and towards the biasing mechanism 44. The chamfered aperture 48 of the lock mechanism body 34 allows the lock mechanism body 34 to tilt and the applied force by the user can cause the lock mechanism body 34 to push against the biasing mechanism 44. Tilting the lock mechanism body 34 against the biasing mechanism 44 can cause the locking pins 50 to disengage from the frame extension 38, as shown in FIG. 6. Subsequently, as shown in FIG. 7, the user can then pull down the handle 36 of the lock mechanism body 34 (e.g., in a rearward direction with respect to the baling system 10), thereby disengaging the engagement assembly 42 of the knotting mechanism 28 from the notch 56 of the lock mechanism body 34. As depicted in FIG. 7, the shiftable lock assembly 14 is now in the unlocked position, where the locking pins 50 of the lock mechanism body 34 are no longer engaged with the frame extension 38 and the notch 56 is not engaged with the engagement assembly 42 of the knotting mechanism 28.

As shown in FIG. 8, after disengaging the shiftable lock assembly 14 to the unlocked position, a user can lift the knotting mechanism 28 from the operating position to the passive position by rotating the knotting mechanism 28 about the shaft 32. Generally, the rotation of the knotting mechanism 28 from the operating position to the passive position can be carried out by a user, who can simply lift the knotting mechanism 28 via the engagement assembly 42, which may have adequate length so as to function as an ergonomic handle for the user to grab onto and lift the knotting mechanism 28. When in the passive position, the components of the knotting mechanism 28 can efficiently accessed by the user for purposes of maintenance, repair, replacement, or the like.

Furthermore, the components described herein may be formed from various materials having sufficient strength and durability, such as steel, iron, etc. Similarly, various methods of manufacture may be used, such as casting, welding, traditional fasteners, etc.

Accordingly, the shiftable lock assemblies described herein improve a user's accessibility of the knotter assemblies without the need for tools or by removing any components from the baling system to unlock the knotter assemblies. Consequently, due to the shiftable lock assemblies of the present disclosure, routine maintenance on the knotter assemblies may be significantly easier to carry out.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A baler system for forming bales comprising:
   (a) a baler frame configured to support the baler system;
   (b) one or more knotter assemblies configured to wrap and tie securement lines around a formed bale, wherein the knotter assemblies comprise a shaft and at least one knotting mechanism positioned on the shaft, wherein the at least one knotting mechanism is configured to rotatably shift on the shaft between an operating position and a passive position;
   (c) an engagement assembly extending from the at least one knotting mechanism; and
   (d) a shiftable lock assembly configured to selectively shift between a locked position and an unlocked position, wherein the shiftable lock assembly comprises a handle, at least one lock mechanism body, and a notch configured to engage the engagement assembly when in the locked position, wherein the shiftable lock assembly secures the at least one knotting mechanism in the operating position when in the locked position.

2. The baler system according to claim 1, wherein the engagement assembly is configured to engage with an upwardly-extending frame extension when the at least one knotting mechanism is in the operating position.

3. The baler system according to claim 2, wherein the frame extension comprises at least one lateral aperture configured to engage the lock mechanism body of the shiftable lock assembly when in the locked position.

4. The baler system according to claim 3, wherein the frame extension is configured to provide a down stop for the engagement assembly and limit the at least one knotting mechanism from moving down past the operating position.

5. The baler system according to claim 4, further comprising a biasing mechanism configured to bias the shiftable lock assembly against the frame extension.

6. The baler system according to claim 5, wherein the biasing mechanism connects the shiftable lock assembly and the frame extension.

7. The baler system according to claim 6, wherein the shiftable lock assembly further comprises a chamfered aperture configured to allow the shiftable lock assembly to tilt and disengage the lock mechanism body from the frame extension.

8. The baler system according to claim 7, wherein at least a portion of the biasing mechanism laterally extends through the chamfered aperture.

9. The baler system according to claim 8, wherein the biasing mechanism comprises a spring.

10. The baler system according to claim 1, wherein the engagement assembly is configured to engage with an upwardly-extending frame extension when the at least one knotting mechanism is in the operating position,
    wherein the shiftable lock assembly further comprises a chamfered aperture configured to allow the shiftable lock assembly to tilt and disengage the lock mechanism body from the frame extension.

11. The baler system according to claim 1, wherein the handle is configured to be gripped by a user and lift the at least one knotting mechanism.

12. The baler system according to claim 1, wherein the notch is formed within the lock mechanism body.

13. A method for accessing a knotting mechanism in a baler system for forming bales, the method comprising:
    (a) providing the baler system comprising—
       (i) a baler frame configured to support the baler system,
       (ii) one or more knotter assemblies configured to wrap and tie securement lines around a formed bale, wherein the knotter assemblies comprise a shaft and at least one knotting mechanism positioned on the shaft, wherein the at least one knotting mechanism is configured to rotatably shift on the shaft between an operating position and a passive position,
       (iii) an engagement assembly extending from the at least one knotting mechanism, and
       (iv) a shiftable lock assembly configured to selectively shift between a locked position and an unlocked position, wherein the shiftable lock assembly comprises a handle, at least one lock mechanism body, and a notch configured to engage the engagement assembly when in the locked position, wherein the shiftable lock assembly secures the at least one knotting mechanism in the operating position when in the locked position, wherein the shiftable lock assembly is in the locked position and the at least one knotting mechanism is in the operating position;

(b) disengaging the shiftable lock assembly from the locked position and into the unlocked position; and (c) transitioning the at least one knotting mechanism from the operating position to the passive position.

14. The method according to claim 13, wherein the engagement assembly is configured to engage with an upwardly-extending frame extension when the at least one knotting mechanism is in the operating position.

15. The method according to claim 14, wherein the frame extension comprises at least one lateral aperture configured to engage the lock mechanism body of the shiftable lock assembly when in the locked position.

16. The method according to claim 15, wherein the frame extension comprises at least one lateral aperture configured to engage the lock mechanism body of the shiftable lock assembly when in the locked position.

17. The method according to claim 16, wherein the baler system further comprises a biasing mechanism configured to bias the shiftable lock assembly against the frame extension, wherein the biasing mechanism connects the shiftable lock assembly and the frame extension.

18. The method according to claim 17, wherein the shiftable lock assembly further comprises a chamfered aperture configured to allow the shiftable lock assembly to tilt and disengage the lock mechanism body from the frame extension, wherein at least a portion of the biasing mechanism laterally extends through the chamfered aperture.

19. The method according to claim 18, wherein the biasing mechanism comprises a spring.

20. The method according to claim 17, wherein the disengaging of step (b) comprises pushing the handle against the biasing mechanism to thereby disengage the lock mechanism body from the lateral aperture of the frame extension.

21. The method according to claim 20, wherein the transitioning of step (c) comprises removing the engagement assembly from the notch of the shiftable lock assembly.

22. The method according to claim 21, wherein the transitioning of step (c) comprises rotating the at least one knotting mechanism from the operating position to the passive position along the shaft.

23. A baler system for forming bales comprising:

(a) a baler frame configured to support the baler system, wherein the baler frame comprises an upwardly-extending frame extension;

(b) one or more knotter assemblies configured to wrap and tie securement lines around a formed bale, wherein the knotter assemblies comprise a shaft and at least one knotting mechanism positioned on the shaft, wherein the at least one knotting mechanism is configured to rotatably shift on the shaft between an operating position and a passive position;

(c) an engagement assembly extending from the at least one knotting mechanism, wherein the engagement assembly is configured to engage with the frame extension when the at least one knotting mechanism is in the operating position; and (d) a shiftable lock assembly configured to move into a locked position and an unlocked position, wherein the shiftable lock assembly comprises a handle, at least one lock mechanism body, a notch within the lock mechanism body configured to engage the engagement assembly, and a biasing mechanism configured to bias the lock mechanism body against the frame extension, wherein the shiftable lock assembly secures the at least one knotting mechanism in the operating position when in the locked position, wherein the frame extension comprises at least one lateral aperture configured to engage the lock mechanism body of the shiftable lock assembly when in the locked position.

* * * * *